Sept. 18, 1945.                W. FERRIS                2,385,069
                              HYDRAULIC DRIVE
                    Filed Feb. 27, 1942          4 Sheets-Sheet 1

INVENTOR.
WALTER FERRIS
BY
    ATTORNEY.

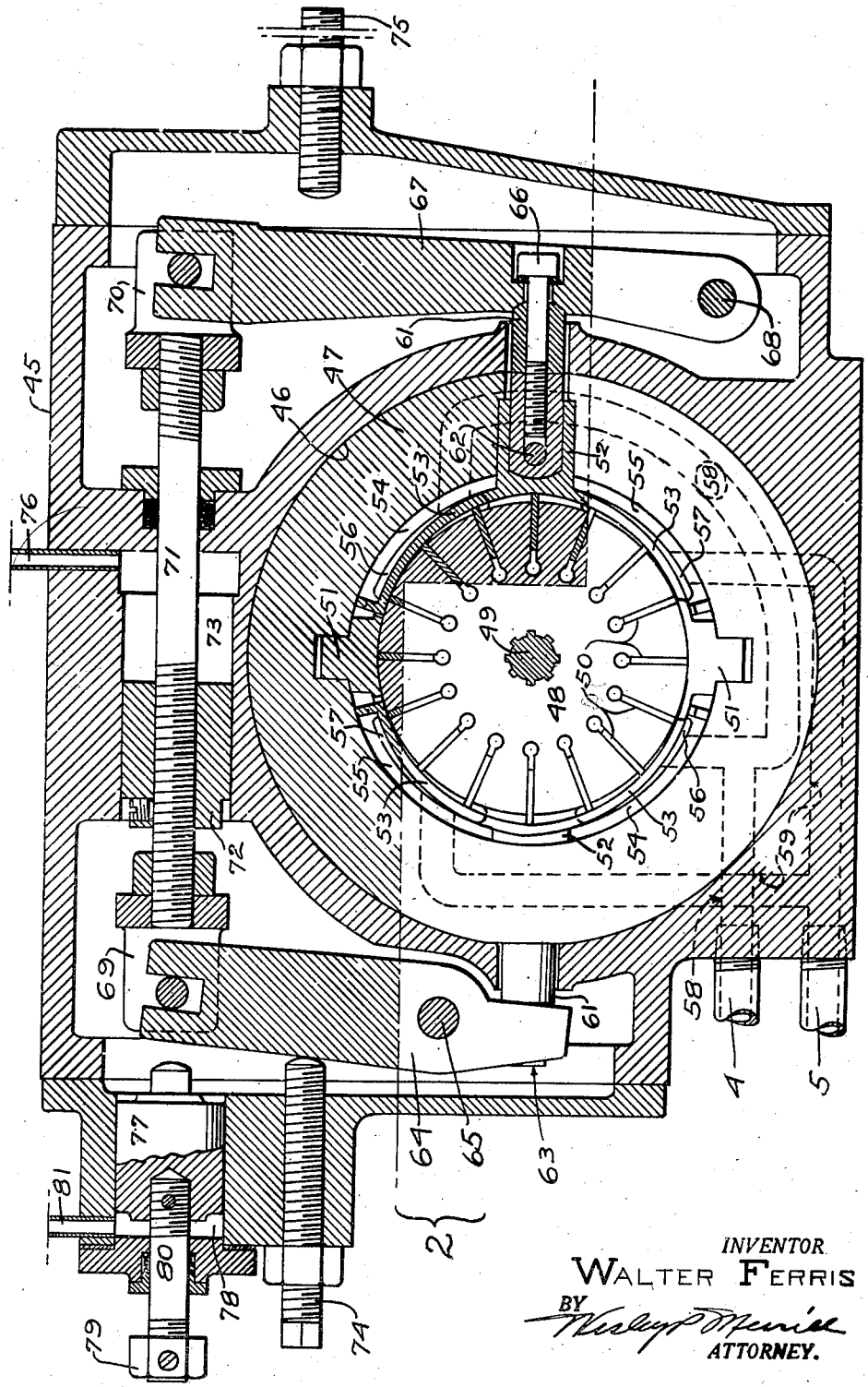

Sept. 18, 1945.                W. FERRIS                2,385,069
                             HYDRAULIC DRIVE
                          Filed Feb. 27, 1942            4 Sheets-Sheet 3
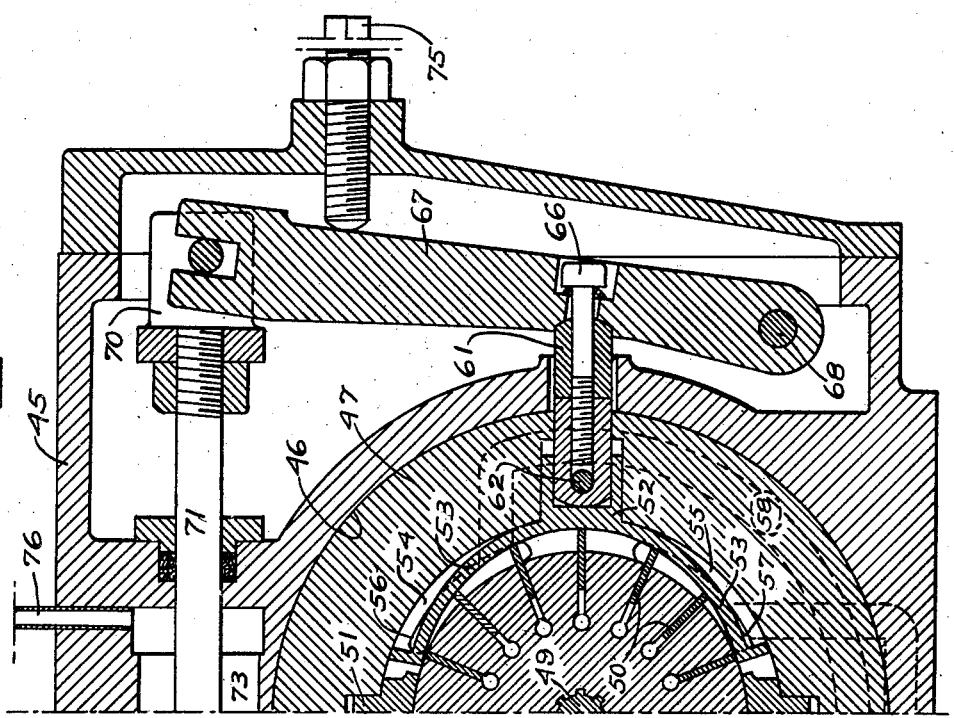
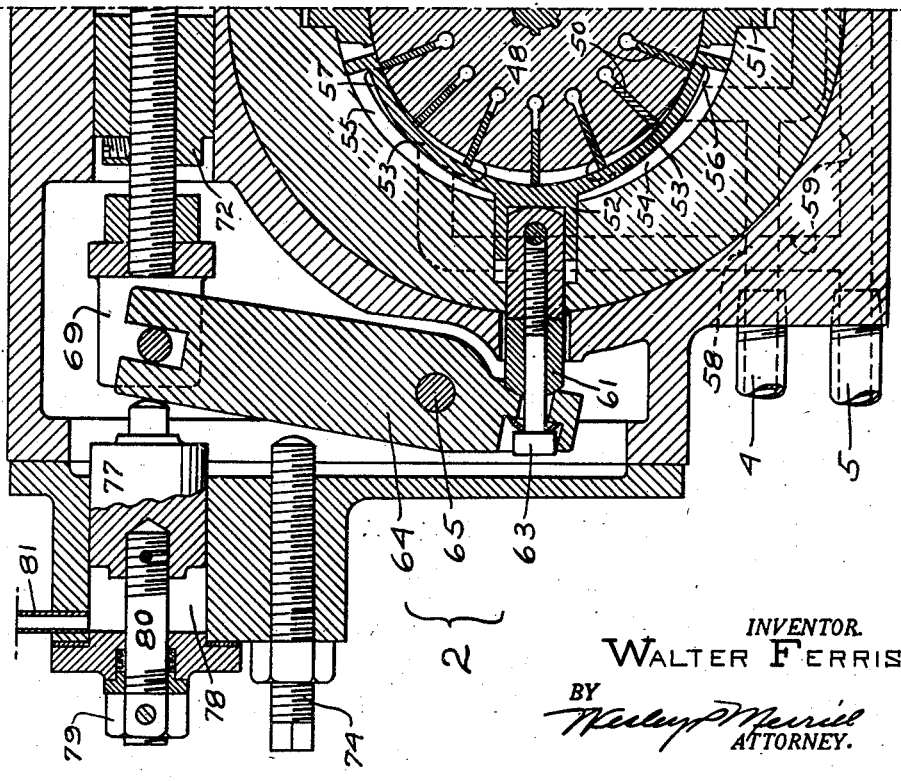
INVENTOR.
WALTER FERRIS
BY
ATTORNEY.

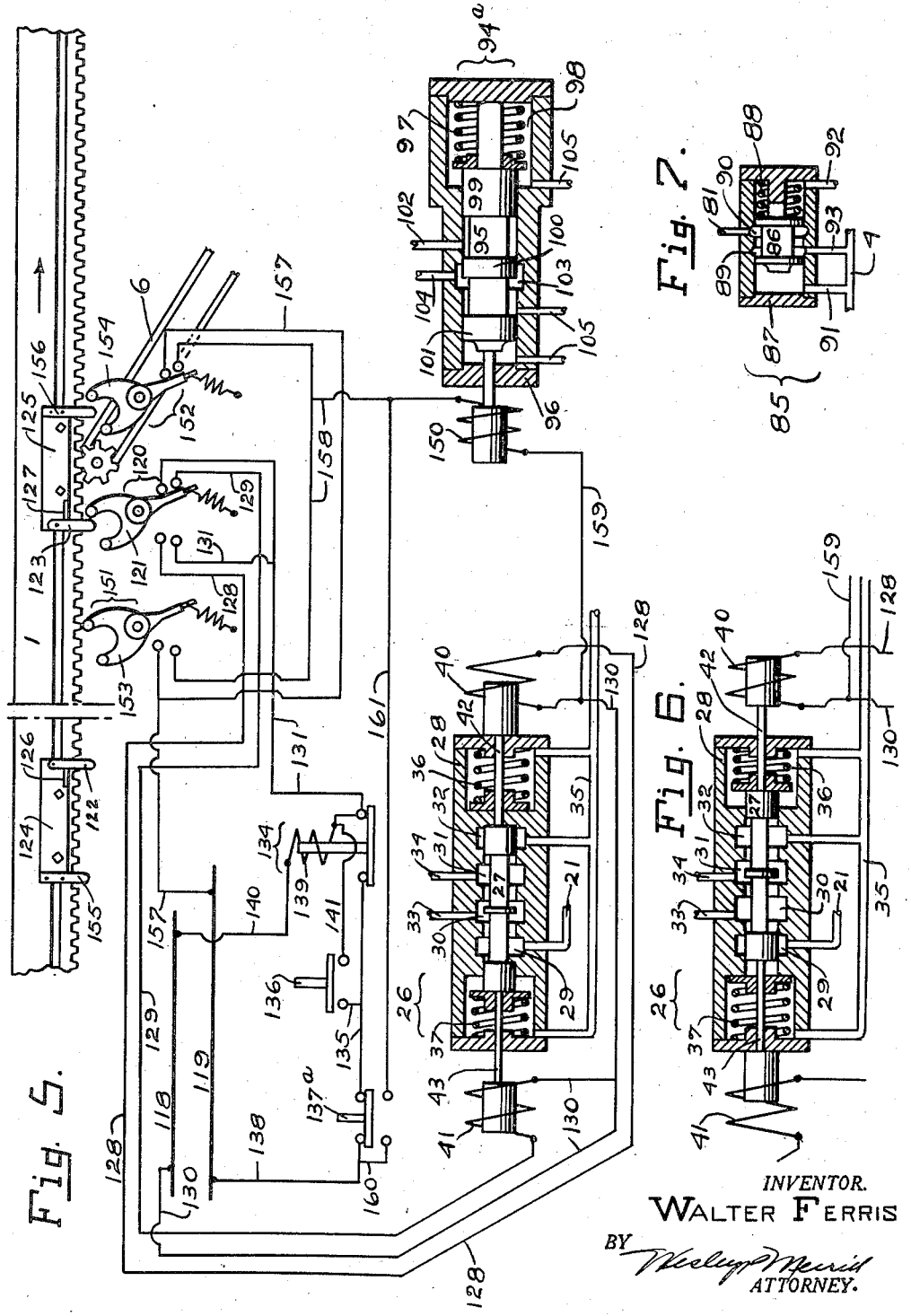

Patented Sept. 18, 1945

2,385,069

UNITED STATES PATENT OFFICE 2,385,069

HYDRAULIC DRIVE

Walter Ferris, Milwaukee, Wis., assignor to The Oilgear Company, Milwaukee, Wis., a corporation of Wisconsin Application February 27, 1942, Serial No. 432,605

20 Claims. (Cl. 60—53)

This application is a continuation-in-part of application Serial No. 344,636 filed July 10, 1940, now abandoned.

The invention relates to hydraulic drives of the type that includes a rotary hydraulic motor, a pump for supplying liquid to the motor to enable it to drive a load, and means for reversing the direction of pump delivery to thereby cause the motor to drive the load first in one direction and then in the opposite direction at predetermined speeds as determined by the relative displacements of the pump and the motor.

A load driven in opposite directions alternately must be decelerated from its current speed to zero speed and then accelerated to a desired speed at the end of its movement in each direction, and the motor torque required to accelerate it to a desired speed is generally greater than the torque required to move it at that speed after it has been accelerated.

A hydraulic transmission constructed according to the invention is particularly adapted for driving an inertia load, that is, a load which requires a greater motor torque to overcome its inertia than the torque required to overcome its friction and other resistances acting in one direction. Such a load will usually overrun the point at which the pump is reversed to thereby reverse the direction of load movement.

Examples of such loads are machine tool carriages that move at high speeds, such as the tables of bed planers. Another example is the swinging machinery of revolving excavators. In a planer, a greater force is required to move the table during its working stroke than during its return stroke and reversal is ordinarily effected by dogs which trip the reversing mechanism as the table approaches the end of its stroke in each direction but the inertia of the table will cause it to overrun the point at which the dogs trip the reversing mechanism. In an excavator, more torque is required to operate the swinging machinery when the dipper is loaded than when it is empty, particularly if the loaded dipper is being moved up an inclined plane due to the excavator being inclined, and the swinging machinery is controlled manually by the operator but the inertia of the revolving masses will cause the dipper to overrun the point at which the operator actuates the controls to stop the swinging movement of the dipper.

The principal objects of the invention are to reduce to a minimum the time required by a transmission to stop or reverse an inertia load and to reduce the amount of overrun of an inertia load to a minimum. Another object is to reduce the time of reversal without increasing the power input to the pump during reversal.

Other objects and advantages of the invention will appear from the description hereinafter given of hydraulic drives in which the invention is embodied.

According to the invention in its general aspect, my improved drive includes a variable displacement rotary hydraulic motor for driving a load, a reversible pump for supplying liquid to the motor to enable it to drive the load, means for adjusting the pump to accelerate or decelerate the load, and means acting coincidentally with the acceleration or deceleration of the load for increasing the displacement of the motor to thereby provide additional torque to effect the required acceleration or deceleration.

The invention is exemplified by the drive shown schematically in the accompanying drawings in which the views are as follows:

Fig. 2 is a vertical section through the hydraulic motor shown in Fig. 1, the upper part of the view being taken through the center of the rotor and the lower part of the view being taken along the face of the rotor.

Figs. 3 and 4 are views showing the several parts of the displacement varying mechanism of the motor in positions different from those shown in Fig. 2.

Fig. 5 is a diagrammatic view showing a modification of the drive shown in Fig. 1.

Fig. 6 is a view showing a pump control valve in a position different from those shown in Figs. 1 and 5.

Fig. 7 is a view showing a motor control valve in a position different from that shown in Fig. 1.

Figure 1:
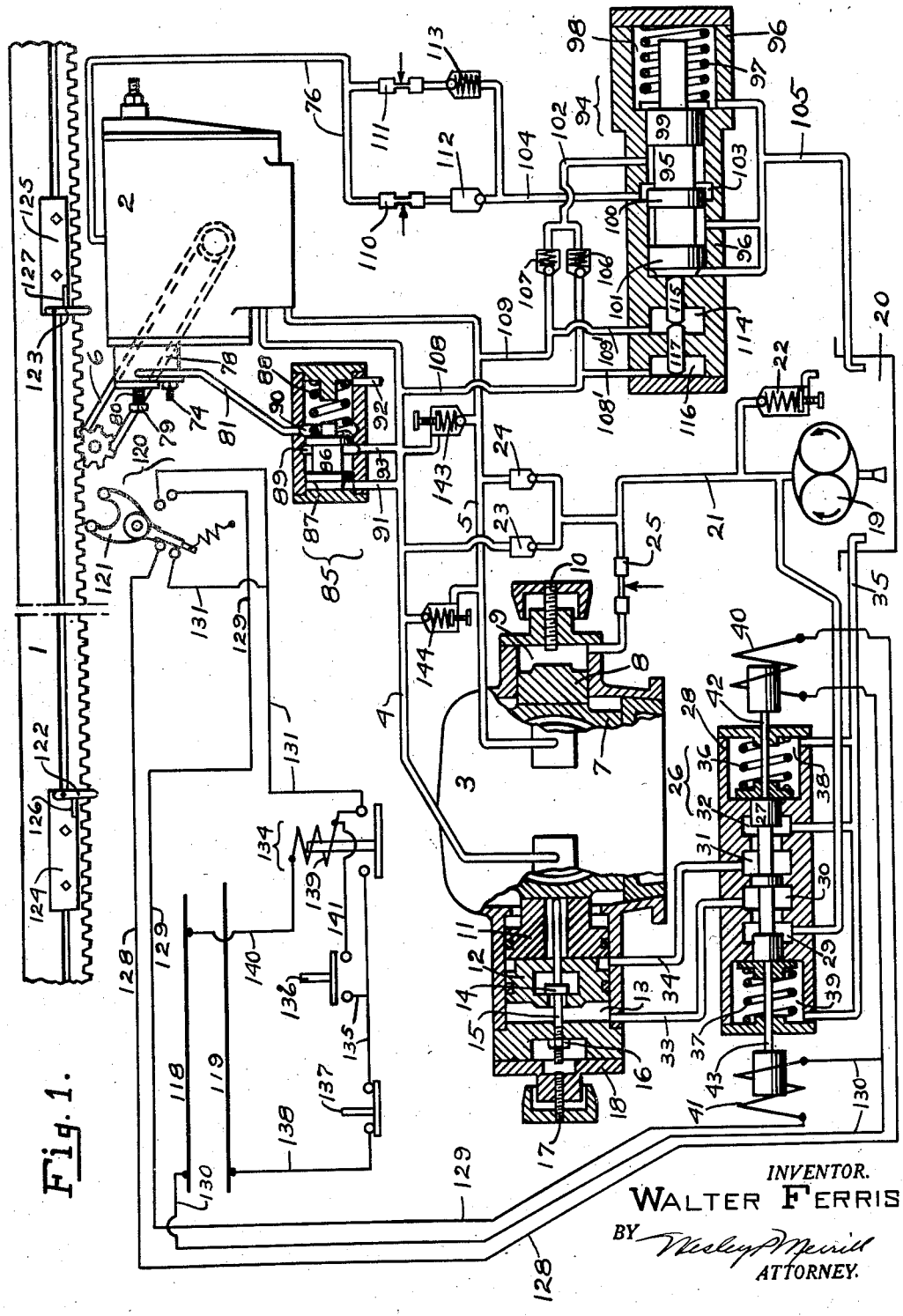
Fig. 1 is a diagram of the hydraulic and electric circuits of a planer drive in which the invention is embodied.

For the purpose of illustration the invention has been shown embodied in planer drives but it may as readily be embodied in drives for other types of machines.

Fig. 1

The invention has been shown in this figure as embodied in a drive for a planer of which, since it forms no part of the invention, only the table has been shown.

Table 1 is driven by a rotary hydraulic motor 2 energized by liquid supplied thereto by a reversible variable displacement pump 3 which has opposite sides thereof connected by two channels 4 and 5 to opposite sides of motor 2.

Motion is transmitted from motor 2 to table 1 through a drive 6 which, in order to simplify the drawings, has been shown as being a rack and pinion drive connected to motor 2 by a chain and sprocket drive but the table is ordinarily provided with a conventional drive such as a nut and screw or a spiral gear drive according to the modern practice.

While any suitable type of pump may be employed, pump 3 has been shown as being of the rolling piston type fully illustrated and described in Patent No. 2,074,068. It is deemed sufficient to state herein that pump 3 has its pumping mechanism arranged within a displacement varying member or slide block 7 and that pump 3 will deliver liquid in a direction and at a rate dependent upon the direction and the distance slide block 7 is shifted from its central or neutral position in which position of slide block 7 the displacement of pump 3 is zero and no liquid will be delivered thereby.

Slide block 7 is at all times urged toward the left by liquid acting upon a piston 8 which is connected to or in engagement with slide block 7 and is fitted in a stationary cylinder 9 carried by the casing of pump 3.

An adjusting screw 10 is threaded through the end of cylinder 9 to limit the movement of piston 8 and slide block 7 toward the right. Turning screw 10 will adjust the rate at which pump 3 will discharge liquid into channel 4.

Slide block 7 is adapted to be moved toward the right by liquid acting upon one or the other of two pistons 11 and 12 which are fitted in a stationary cylinder 13 carried by the pump casing. Piston 11 engages slide block 7 and piston 12 is adapted to engage the outer face of piston 11.

The movement of piston 12 toward the right is limited by a collar 14 fixed on a stop rod 15 which extends loosely through pistons 11 and 12 and through the head of cylinder 13. The inner end of rod 15 is adapted to engage slide block 7 and the outer end of rod 15 is provided with a nut 16 which is adjusted to so position collar 14 that piston 12 when energized will move slide block 7 exactly to its neutral position.

The outer end of rod 15 is adapted to engage an adjusting screw 17 which is threaded through a cap 18 fixed to the head of cylinder 13. Turning screw 17 adjusts the distance rod 15 and slide block 7 may be moved toward the left to thereby determine the rate at which pump 3 will deliver liquid into channel 5.

Pistons 11 and 12 are larger than piston 8 so that slide block 7 will be moved toward the right when liquid is simultaneously supplied to both of cylinders 9 and 13 at the same pressure.

Liquid for operating pistons 11 and 12 is supplied by a gear pump 19 which is ordinarily driven in unison with pump 3 and arranged in the casing thereof according to the usual practice but which, for the purpose of illustration, has been shown as being separate therefrom.

Gear pump 19 draws liquid from a reservoir 20 and discharges it into a branched supply channel 21 at a rate in excess of requirements, the excess liquid being exhausted through a relief valve 22 which enables gear pump 19 to maintain a channel 21 a pressure equal to the resistance of relief valve 22.

Supply channel 21 has two of its branches connected, respectively, to opposite sides of the main circuit through two check valves 23 and 24 which permit gear pump 19 to keep the circuit flooded and which protect gear pump 19 from the high pressures created by pump 3. While check valves 23 and 24 have been shown connected to channels 4 and 5 respectively, they are ordinarily arranged inside the casing of pump 3. Also, pump 3 is ordinarily provided with an automatic suction valve, such as the valve shown schematically in Patent No. 2,114,005, in order that pump 3 may draw liquid from reservoir 20 in case gear pump 19 at any time fails to supply sufficient liquid to the low pressure side of the circuit.

Another branch of supply channel 21 is connected to the outer end of cylinder 9 so that piston 8 is constantly urged toward the left by a constant force which is proportional to gear pump pressure. This branch has an adjustable choke 25 arranged therein to limit the rate of flow to and from cylinder 9 and thereby limit the rate at which pistons 8, 11 and 12 can shift slide block 7 to reverse pump 3.

Another branch of supply channel 21 is connected to a valve 26 which controls the flow of liquid to and from cylinder 13 and thereby controls the operation of pump 3. Control valve 26 has a valve member or plunger 27 fitted in a valve casing 28 to control communication between four annular grooves or ports 29, 30, 31 and 32 formed in valve casing 28.

Port 29 communicates with the branch of supply channel 21 that is connected to valve 26. Port 30 is connected by a channel 33 to cylinder 13 at or near the outer end thereof. Port 31 is connected by a channel 34 to cylinder 13 at a point between pistons 11 and 12. Port 32 is connected to a drain channel 35 which discharges into reservoir 20.

When valve member 27 is in its central position as shown in Fig. 1, pressure extends from channel 21 through valve casing 28 and channel 33 to the left end of cylinder 13 and holds piston 12 against collar 14 on stop rod 15, and the space between pistons 11 and 12 communicates through channel 34 and valve casing 28 with drain channel 35 so that the pressure in cylinder 9 will cause piston 8 to move slide block 7 against piston 11 and piston 11 against piston 12 in which position of slide block 7 pump 3 is at zero stroke and no liquid will be delivered thereby.

When valve member 27 is shifted toward the right to the position shown in Fig. 6, port 29 is blocked and channels 33 and 34 are open to drain channel 35 so that liquid supplied by gear pump 19 to cylinder 9 can cause piston 8 to move slide block 7 toward the left until rod 15 abuts adjusting screw 17 at which time pump 3 will discharge liquid into channel 5 at a rate determined by the adjustment of screw 17.

When valve member 27 is shifted toward the left to the position shown in Fig. 5, port 32 is blocked and channels 33 and 34 are open to port 29 so that liquid from gear pump 19 can flow through channel 21, valve casing 28 and channels 33 and 34 to cylinder 13 and cause pistons 11 and 12 to move slide block 7 toward the right until piston 12 abuts collar 14 and then piston 11 will move slide block 7 toward the right until piston 8 abuts adjusting screw 10 at which time pump 3 will discharge liquid into channel 4 at a rate determined by the adjustment of screw 10.

Valve member 27 is normally held in its central or neutral position by two springs 36 and 37 arranged, respectively, in two chambers 38 and 39 which are formed in opposite ends of valve casing 28 and connected to drain channel 35.

Valve member 27 is adapted to be shifted in one direction or the other by one or the other of two solenoids 40 and 41 the cores of which are connected, respectively, to valve stems 42 and 43 which are fixed to opposite ends of valve member 27 and extend outward through chambers 38 and 39. Solenoids 40 and 41 are controlled in a manner to be presently described.

Motor 2 may be of any suitable type but, since a motor of the vane type has a considerably greater torque in proportion to its weight and size than a motor of the piston type, motor 2 has been shown in Figs. 2 to 4 as being of the vane type and, with the exception of the mechanism for shifting the displacement varying members, as being substantially the same as the motor shown in Patent No. 2,141,170 to which attention is directed for details of construction.

It is deemed sufficient to state herein that motor 2 has its driving mechanism arranged within a casing 45 having a circular recess 46 formed therein and an annular spacer ring 47 closely fitted within recess 46. Spacer ring 47 has arranged therein a cylindrical rotor 48 which is smaller in diameter than the inner diameter of ring 47 and is splined on a shaft 49 which is journaled in casing 45 and connected to table 1 by drive 6.

Rotor 48 has a plurality of radial vane slots extending inward from its periphery and a plurality of vanes 50 fitted in said slots and adapted to engage a continuous vane track which is arranged in the space between the outer periphery of rotor 48 and the inner periphery of spacer ring 47 and consists of two stationary bridges 51 arranged diametrically opposite each other, two movable bridges 52 spaced 90° from bridges 51, and four flexible track sections 53 each of which has one of its ends fixed to one side of a movable bridge 52 and its other end forming a sliding joint with the adjacent stationary bridge 51. The inner face of each of bridges 51 and 52 forms a part of the vane track and is concentric with rotor 48 through an angular distance slightly greater than the angular distance between adjacent vanes.

Spacer ring 47 and bridges 51 are of the same thickness but rotor 48, bridges 52 and track sections 53 are just enough thinner to permit them to move freely between two cheek plates (not shown) which are held in firm engagement with opposite faces of spacer ring 47 as plainly illustrated in Patent No. 2,141,170.

Bridges 51 are rigidly secured in or are formed integral with spacer ring 47 and have their inner faces arranged close to the periphery of rotor 48. Bridges 52 are slidably fitted in ring 47 to form fluidtight joints therewith and have their inner faces spaced from the periphery of rotor 48 when the motor is operating.

The space between the periphery of rotor 48 and the inner periphery of ring 47 is thus divided by bridges 51 and 52 and the vanes in contact therewith into a pair of diametrically opposed chambers 54 and a pair of diametrically opposed chambers 55. One of the cheek plates (not shown) is provided with two ports 56, each of which opens into a chamber 54, and two ports 57 each of which open into a chamber 55. Ports 56 communicate with a branched passage 58 which is formed in casing 45 and communicates at its outer end with channel 4. Ports 57 communicate with a branched passage 59 which is formed in casing 45 and communicates at its outer end with channel 5.

The vanes 50 which are in contact with bridges 51 and 52 provide a substantially fluidtight seal between adjacent chambers 54 and 55 so that, when pump 3 directs liquid to motor 2 through channel 4, the liquid will flow through passage 58 and ports 56 into chambers 54 and cause vanes 50 to rotate rotor 48 and shaft 49 in a clockwise direction in respect to Fig. 2, and the liquid carried across bridges 52 by the vanes will be exhausted into chamber 55 and then flow through ports 57, passage 59 and channel 5 to the intake of pump 3. When pump 3 discharges into channel 5, the above described flow of liquid will be reversed and rotor 48 will rotate in a counterclockwise direction.

In order that motor 2 may be started, it is necessary that vanes 50 be held in contact with the bridge portions of the vane track. This may be accomplished in any suitable manner such as by means of fluid pressure supplied to the inner ends of the vane slots as fully explained in Patent No. 2,141,170.

The displacement of motor 2 may be varied by moving bridges 52 toward or from the periphery of rotor 48. Moving bridges 52 inward will increase the motor speed and decrease the available torque while moving bridges 52 outward will decrease the motor speed and increase the available torque.

For the purpose of illustration, bridges 52 have been shown as adapted to be adjusted to either a minimum displacement position as shown in Fig. 2, a maximum displacement position as shown in Fig. 4 or an intermediate displacement position as shown in Fig. 3. When motor 2 is adjusted as shown in Fig. 3, it will operate at a predetermined speed and, for example, be capable of driving table 1 at the rate desired when a tool is taking a cut from work carried by table 1.

When motor 2 is adjusted as shown in Fig. 2, it will operate at its highest adjusted speed and, for example, be capable of driving table 1 at the speed desired during the return or non-cutting stroke thereof. When motor 2 is adjusted as shown in Fig. 4, its torque will be maximum and it will be capable, for example, of decelerating table 1 to zero speed and then accelerating it toward its normal speed with a minimum of delay.

Motor 2 is not necessarily an oversize motor underrated for the particular drive of which it forms a part but it may be of the same size that would ordinarily be employed to drive its load and have the same size ports and pipe connections but it would be so constructed that its displacement could be increased beyond the normal maximum. This is readily accomplished in a vane type motor but, when so constructed, the maximum available power output of the motor would not be proportional to the maximum displacement for the reason that the ports and passages of the motor would be too small to carry at normal rate of flow the volume of liquid required to drive the motor at its normal rotative speed when it was at maximum displacement. During operation at maximum displacement and normal speed the fluid resistance is abnormal, but this merely assists in the deceleration of the load.

Bridges 52 are urged outward by the motive liquid acting upon the inner faces thereof and they are adapted to be moved inward by hydraulically operated displacement varying mechanism, adjustable stops being provided for accurately locating bridges 52 in each of their positions.

As shown, that part of each bridge 52 that is slidable in spacer ring 47 is hollow and has arranged therein a push rod 61 which is connected thereto by a pin 62. Push rod 61 extends loosely through the inner wall of casing 45 and has convex faces on its ends.

The convex outer end of the left hand push rod 61 is held by a bolt 63 in contact with a complementary surface formed in the lower end of a lever 64 which is pivoted intermediate its ends upon a shaft 65 carried by motor casing 45.

The convex outer end of the right hand push rod 61 is held by a bolt 66 in contact with a complementary surface formed in a lever 67 which is pivoted at its lower end upon a shaft 68 carried by casing 45. In order that levers 64 and 67 may rock upon their shafts without distorting bolts 63 and 66 or push rods 61, bolts 63 and 66 extend loosely through levers 64 and 67, respectively, and have spring washers under their heads so as to permit a slight relative movement between each bolt head and lever.

The upper ends of levers 64 and 67 are pivoted, respectively, to two forks 69 and 70 fixed upon opposite ends of a piston rod 71 which has a piston 72 fixed thereon and fitted in a cylinder 73 formed in casing 45. The movement of piston 72 in opposite directions is limited by two stop screws 74 and 75 which are threaded into opposite ends of casing 45 and adapted to be engaged by levers 64 and 67 respectively.

Cylinder 73 is adapted to be connected either to the pressure side of the hydraulic circuit or to drain through a channel 76 as will presently be explained. When channel 76 is connected to the pressure side of the circuit, liquid will enter cylinder 73 and cause piston 72 to swing the upper ends of levers 64 and 67 toward the left until lever 64 engages stop screw 74, thereby reducing motor displacement to a predetermined minimum as determined by the adjustment of screw 74 and as shown in Fig. 2.

When cylinder 73 is opened to drain, the upper ends of levers 64 and 67 are free to swing toward the right so that the motive liquid acting upon the inner faces of bridges 52 will move them outward until lever 67 engages stop screw 75 at which time motor displacement is at a maximum as determined by the adjustment of stop screw 75 and as shown in Fig. 4.

Adjustment of bridges 52 to their intermediate position is effected by means of a piston 77 which is adapted to engage the upper end of lever 64 and is fitted in a cylinder 78 formed in casing 45. Movement of piston 77 toward the right is limited by a stop nut 79 threaded upon a stem 80 which extends through the head of cylinder 78 and is fixed to piston 77.

Cylinder 78 is adapted to be connected to one side of the hydraulic circuit or to be connected to drain through a channel 81. When channel 81 is connected to the hydraulic circuit, liquid will enter cylinder 78 and move piston 77 toward the right until nut 79 engages the head of cylinder 78 so that, when liquid is supplied to cylinder 73 to cause piston 72 to move toward the left, the upper end of lever 64 will engage piston 77 which will arrest further movement of piston 72 and hold bridges 52 in their intermediate positions as shown in Fig. 3. When cylinder 78 is connected to drain and liquid is supplied to cylinder 73, piston 72 will swing the upper ends of levers 64 and 67 toward the left until stopped by screw 74 as previously explained.

Referring now more particularly to Fig. 1, the delivery of liquid to cylinder 78 is under the control of an automatic valve 85 having a valve member or plunger 86 fitted in the bore of a valve casing 87 and urged toward the left by a spring 88. The bore of valve casing 87 has two annular grooves or ports 89 and 90 formed in its wall intermediate the ends thereof, its left end connected to channel 4 by a channel 91 and its right end connected to a drain channel 92. Port 89 is connected to channel 4 by a channel 93 and port 90 has channel 81 connected thereto.

The arrangement is such that, when pump 3 is discharging into channel 4 and the pressure therein exceeds a predetermined value, pressure will extend from channel 4 through channel 91 to the left end of casing 87 and move valve member 86 toward the right against the resistance of spring 88 to connect port 90 to port 89 as shown in Fig. 7 and then liquid will flow from channel 4 through channel 93, valve casing 87 and channel 81 to cylinder 78 and move piston 77 toward the right to the position shown in Fig. 3. When the pressure in channel 4 drops below the predetermined value, spring 88 will move piston 86 toward the left to connect port 90 to drain channel 92 as shown in Fig. 1 and then piston 77 may be moved toward the left when servo-motor 72—73 (Fig. 2) is energized.

The flow of liquid to and from servo-motor 72—73 (Fig. 2) is under the control of either a pressure responsive valve 94 as shown in Fig. 1 or a position responsive valve 94ᵃ as shown in Fig. 5.

For the purpose of illustration, valve 94 has been shown as having a valve member or plunger 95 arranged in the bore of a valve casing 96 and urged toward the left to the position shown in Fig. 1 by a spring 97 arranged within a spring chamber 98 fixed to or formed upon the right end of casing 96. Valve member 95 is provided with three spaced apart heads or pistons 99, 100 and 101 to control communication between a channel 102 which communicates with the bore of casing 96 at a point between pistons 99 and 100, an annular groove or port 103 which is formed in the wall of the bore of casing 96 and has a channel 104 connected thereto, and a drain channel 105 which discharges into reservoir 20 and communicates with the bore of casing 96 at a point between pistons 100 and 101 and also communicates with spring chamber 98 and with the left end of the bore of casing 96.

Channel 102 is connected to the outlets of two check valves 106 and 107 the inlets of which are connected, respectively, to channels 4 and 5 by channels 108 and 109. Check valves 106 and 107 permit liquid to flow freely from either channel 4 or channel 5 into channel 102 but prevent flow in the opposite direction so that there is no flow through channel 102 from one to the other of channels 4 and 5.

Channel 104 is connected to channel 76 but, in order to limit the rate at which the displacement of motor 2 is changed, it is connected thereto through suitable flow restricting means. However, since liquid is supplied to cylinder 73 at a high pressure and discharged therefrom at a lower pressure and since it is sometimes desirable that the displacement of motor 2 be increased at one rate and decreased at a different rate, channel 104 has been shown connected to channel 76 through two adjustable chokes 110 and 111, which are connected between channels 76 and 104 in parallel with each other, and two check valves 112 and 113 which open in opposite directions and are each connected in series with a choke 110 or 111.

Valve member 95 is adapted to be shifted toward the right against the resistance of spring 97 to connect cylinder 73 to drain in response to the pressure in either side of the hydraulic circuit circuit exceeding a predetermined value. This may be accomplished by means of two servomotors which are energized from opposite sides of the circuit.

As shown, a cylinder 114 is arranged upon the left end of valve casing 96, a plunger 115 extends through and is closely fitted for reciprocation in the wall between cylinder 114 and the bore of casing 96, a cylinder 116 is arranged upon the left end of cylinder 114, a plunger 117 extends through and is closely fitted for reciprocation in the wall between cylinders 114 and 116, and branches 108' and 109' of channels 108 and 109 are connected, respectively, to cylinders 116 and 114.

The arrangement is such that, when valve member 95 is in the position shown in Fig. 1, pressure in either channel 4 or channel 5 will extend through channel 108 or 109, check valve 106 or 107, channel 102, valve casing 96, channel 104, check valve 112, choke 110 and channel 76 to cylinder 73 and cause piston 72 to swing the upper ends of levers 64 and 67 toward the left to decrease the displacement of motor 2 as previously explained, choke 110 limiting the rate at which liquid is delivered to cylinder 73 and thereby limiting the rate at which motor displacement is reduced.

When pump 3 is discharging into channel 5 and is creating therein a pressure in excess of a given value, this pressure will extend through channels 109 and 109' to cylinder 114 and cause plunger 115 to shift valve member 95 toward the right to the position shown in Fig. 5. When pump 3 is discharging into channel 4 and is creating therein a pressure in excess of a given value, this pressure will extend through channels 108 and 108' to cylinder 116 and cause plunger 117 to shift plunger 115 and valve member 95 toward the right until valve member 95 is in the position shown in Fig. 5.

Shifting valve member 95 to the position shown in Fig. 5 will disconnect channel 104 from channel 102 and connect it to drain channel 105, and then the pressure acting upon the inner faces of bridges 52 (Fig. 2) will move them outward to increase the displacement of motor 2. Bridges 52 in moving outward will cause levers 64 and 67 to move piston 72 toward the right and piston 72 will expel liquid from cylinder 73 through channel 76, choke 111 (Fig. 1), check valve 113, channel 104 and valve casing 96 into drain channel 105, choke 111 limiting the rate at which liquid may be expelled from cylinder 73 and thereby limiting the rate at which motor displacement is increased.

When the pressure created by pump 3 drops below the given value, spring 97 will shift valve member 95 to the position shown in Fig. 1 and then liquid will flow through valve 94 to cylinder 73 and cause piston 72 to reduce the displacement of motor 2.

As previously explained, pump 3 is adapted to deliver liquid into channel 4 or channel 5 in response to the plunger 27 of pump control valve 26 being shifted in one direction or the other by one or the other of solenoids 40 and 41 to thereby cause pump slide block 7 to be shifted in one direction or the other.

Current for energizing solenoids 40 and 41 is supplied thereto from a power line shown as consisting of two conductors 118 and 119. Current is directed to one or the other of solenoids 40 and 41 under the control of a double acting limit switch 120 which is adapted to be shifted from one to the other of its two positions by suitable dogs carried by planer table 1.

The showing of the electric circuit and the table dogs is purely schematic and it is to be understood that in practice conventional table dogs are employed and that the circuit includes limit, starting, stop, inching and contactor switches of conventional types.

As shown, limit switch 120 has its actuating arm 121 forked and adapted to be engaged first by one and then by the other of two dogs 122 and 123 which have the upper ends thereof pivoted, respectively, to two blocks 124 and 125 adjacent to two stops 126 and 127 fixed to blocks 124 and 125 respectively, blocks 124 and 125 being attached to table 1 in adjusted positions in the usual manner.

The arrangement is such that, when table 1 approaches the end of its movement toward the right, dog 122 will engage the right hand fork of switch arm 121 and operate switch 120 to the position shown in Fig. 1 which, as will presently be explained, will effect reversal of table 1. When table 1 moves in the opposite direction, dog 122 will swing freely upon its pivot as it passes switch arm 121 so that switch 120 is not operated.

When table 1 approaches the limit of its movement toward the left, dog 123 will engage the left hand fork of switch arm 121 and operate switch 120 to the position shown in Fig. 5 which, as will presently be explained, will effect reversal of table 1. When table 1 moves in the opposite direction, dog 123 will swing freely upon its pivot as it passes switch arm 121 so that switch 120 is not operated.

Limit switch 120 has one pair of contacts disposed at one side of arm 121 and another pair of contacts disposed at the other side thereof. One contact of one pair is connected to one end of the winding of solenoid 40 by a conductor 128, one contact of the other pair is connected to one end of the winding of solenoid 41 by a conductor 129, and the other ends of both windings are connected by a conductor 130 to power line 118.

The other two contacts of switch 120 are both connected by a conductor 131 to one terminal of a magnetic switch 134 the second terminal of which is connected by a conductor 135 to one terminal of a normally open starting switch 136 and to one terminal of a normally closed stop switch 137 the second terminal of which is connected by a conductor 138 to power line 119. The magnet 139 of switch 134 has one end of its winding connected to power line 118 by a conductor 140. The other end of this winding is connected by a conductor 141 to the second terminal of switch 136 and it is also connected to the terminal of switch 134 to which conductor 131 is connected.

Operation

Assuming that the parts are in the positions shown in Fig. 1 and that pumps 3 and 19 are running, the drive will operate as follows:

Pressure from gear pump 19 will extend through channel 21, valve 26 and channel 33 to the outer end of cylinder 13 and cause piston 12 to hold pump 3 at zero stroke so that motor 2 is idle and the planer is at rest.

When starting switch 136 is closed a circuit (119—138—137—135—136—141—139—140—118) is established to energize magnet 139, thereby causing switch 134 to close and establish a circuit (119—138—137—135—134—131—120—128—

40—130—118) to energize solenoid 40. Closing switch 134 short circuits starting switch 136 so that magnet 139 will remain energized and hold switch 134 closed when starting switch 136 is released.

Solenoid 40 will shift valve plunger 27 to the position shown in Fig. 6 so that channels 33 and 34 are open to drain channel 35 and gear pump liquid will flow to cylinder 9 and cause piston 8 to move slide block 7 toward the left so that pump 3 discharges into channel 5. The pressure created in channel 5 by pump 3 will extend through channels 108 and 108′ to cylinder 114 and, since a large force is required to overcome the friction and inertia of table 1, pump pressure will rise high enough to cause plunger 115 to shift valve member 95 to the position shown in Fig. 5 so that cylinder 73 (Fig. 2) is connected to drain and the pressure acting upon the inner faces of bridges 52 will increase motor displacement as previously explained. Then the liquid discharged by pump 3 will flow through channel 5, motor 2 and channel 4 back to pump 3 and cause motor 2 to operate in a counterclockwise direction and move table 1 toward the left at slow speed.

After table 1 has been started and accelerated, less force is required to keep it moving so that the pressure drops and permits spring 97 to move valve member 95 to the position shown in Fig. 1 so that liquid is directed to cylinder 73 to decrease motor displacement at the rate determined by choke 110. Since at this time there is little if any pressure in channel 4, valve plunger 86 remains in the position shown in Fig. 1 so that motor 2 is adjusted to a minimum displacement and drives table 1 toward the left at high speed.

As table 1 approaches the limit of its movement toward the left, dog 123 engages the left hand fork of switch arm 121 and operates switch 120 to the position shown in Fig. 5, thereby breaking the circuit through solenoid 40 to deenergize it and establishing a circuit (119—138—137—135—134—131—120—129—41—130—118) to energize solenoid 41 which will shift valve plunger 27 toward the left to the position shown in Fig. 5. Liquid from gear pump 19 will now flow through channel 21, valve 26 and channels 33 and 34 to cylinder 13 and cause pistons 11 and 12 to move pump slide block 7 toward the right at the rate determined by choke 25 so that, as soon as slide block 7 passes its central position, pump 3 will discharge into channel 4.

If the force required to overcome the inertia of table 1 did not exceed the force required to overcome the friction thereof, table 1 would be decelerated as fast as the displacement of pump 3 was reduced and it would stop as soon as pump displacement was reduced to zero.

However, a large amount of energy was stored in table 1 and connected moving parts during its rapid movement toward the left and this energy tends to keep it moving in the same direction at the same speed so that table 1 will drive motor 2 and cause it to function as a pump and discharge liquid into channel 4.

Until the displacement of pump 3 is reduced to zero, motor 2 will discharge liquid into channel 4 at a rate in excess of the rate at which pump 3 draws liquid from channel 4 and, after pump 3 is reversed and until motor 2 is reversed, both the pump and the motor will discharge into channel 4, thereby creating in channel 4 a high pressure which extends through channels 108 and 108′ to cylinder 116 and causes plunger 117 to move plunger 115 and valve member 95 toward the right until valve member 95 is in the position shown in Fig. 5 so that the displacement of motor 2 is increased to maximum as previously explained.

The excess liquid discharged into channel 4 is exhausted through a suitable relief valve which opens at a pressure in excess of the pressure required to enable motor 2 to drive table 1 at the desired speed. For the purpose of illustration, two oppositely opening relief valves 143 and 144 are shown connected between channels 4 and 5 so that the excess liquid exhausted from the high pressure channel is directed into the low pressure channel, thereby leaving to gear pump 19 only the task of making up leakage losses.

However, this arrangement is ordinarily not satisfactory for the reason that it does not include suitable provision for dissipating enough of the heat generated when liquid is exhausted through a relief valve. In practice, the pump has its relief valves arranged inside its casing and adapted to discharge into the pump reservoir and the pump is provided with a suction valve which automatically connects the low pressure side of the pump to the reservoir, as previously explained, so that motor 2 when driven by table 1 can draw its supply of liquid directly from the pump reservoir.

Since motor 2 is creating a high pressure in channel 4, increasing its displacement causes a corresponding increase in its torque and enables it to decelerate table 1 to zero speed in a minimum period of time and with a minimum of overrun, that is, table 1 will move only a short distance beyond the point at which limit switch 120 is operated.

If pump 3 should be reversed quickly, both it and motor 2 would discharge into channel 4 and a large volume of liquid would be exhausted through valve 144 but, if choke 25 is so adjusted that pump slide block 7 reaches its zero displacement position just as or just before the speed of table 1 is reduced to zero, only a small amount of energy is wasted at the relief valve.

When the speed of table 1 is reduced to zero, the liquid discharged by pump 3 into channel 4 causes motor 2 to operate in a clockwise direction and starts table 1 moving toward the right. Since a large force is required to start table 1 moving toward the right, the pressure in channels 4, 108 and 108′ remains high enough to enable plunger 117 to hold valve member 95 in the position shown in Fig. 5 so that motor 2 remains adjusted at its maximum displacement and has a high torque available for starting table 1.

Since the force required to keep table 1 moving is less than the force required to start it, the pressure in channel 4 will drop shortly after table 1 starts moving toward the right. This decrease in pressure will permit spring 97 to return valve member 95 to the position shown in Fig. 1 to effect a reduction in motor displacement in the previously described manner but motor displacement will not be reduced to the predetermined minimum for the reason that, when high pressure was first created in channel 4, valve member 86 was shifted to the position shown in Fig. 7 and then liquid entered cylinder 78 and moved piston 77 to the position shown in Fig. 3. Consequently, when valve member 95 is returned to the position shown in Fig. 1, motor 2 is adjusted to its intermediate displacement and will move table 1 toward the right at a speed suitable for a tool to take a cut from work carried by table 1.

As table 1 approaches the limit of its movement toward the right, dog 122 will engage the right hand fork of switch arm 121 and operate switch 120 to the position shown in Fig. 1, thereby breaking the circuit through solenoid 41 and reestablishing the circuit through solenoid 40 so that pump 3 is reversed and causes motor 2 to be reversed as previously explained. Table 1 due to its inertia will at first continue to drive motor 2 and thereby cause a high pressure to be created in channel 5 so that the displacement of motor 2 is increased to maximum during reversal of table 1 in the same manner as during reversal of table 1 at the end of its movement toward the left.

The machine may be stopped at any time by opening stop switch 137 which breaks the circuits through and deenergizes magnet 139 and the solenoid 40 or 41 that is energized at the time. Deenergizing the solenoid permits pump control valve plunger 27 to be returned by one or the other of springs 36 and 37 to the position shown in Fig. 1, thereby causing the displacement of pump 3 to be reduced to zero as previously explained. Deenergizing magnet 139 permits switch 134 to open so that neither solenoid can be energized when stop switch 137 closes. The machine will remain idle until starting switch 136 is closed.

An electrically controlled machine tool having a reciprocable table is ordinarily provided with one or more inching switches by means of which the table may be caused to move in a desired direction under the control of the operator. The table will move only while an inching switch is held closed and it will stop when the switch is released. Since inching switches are well known and form no part of the present invention, no such switch is shown in the drawings.

Fig. 5

Instead of motor displacement being increased in response to an increase in pressure during reversal, it may be increased in response to the positioning of a control element such as a dog carried by a reciprocating machine tool carriage or the lever which controls the swinging machinery of an excavator.

For the purpose of illustration, this feature of the invention has been shown in this figure as being embodied in a control for a planer table drive which is the same as the drive shown in Fig. 1 except that the motor displacement control valve is operated electromagnetically in response to planer table 1 reaching a given point in its movement in each direction and in response to operation of a stop switch. Consequently, like parts have been indicated by like reference numerals and no further description thereof is deemed necessary.

As shown, the drive is provided with a motor displacement control valve 94ª which performs the same function as the valve 94 shown in Fig. 1, is connected into the circuit in exactly the same manner, and is identical thereto except that its plunger 95 is adapted to be shifted toward the right by a solenoid 150 instead of by servo-motors 114—115 and 116—117.

Solenoid 150 is controlled by two single acting snap switches 151 and 152 arranged upon opposite sides of limit switch 120 and provided, respectively, with forked actuating arms 153 and 154 which are adapted to be operated by two dogs 155 and 156 carried, respectively, by the blocks 124 and 125 on table 1. Switches 120, 151 and 152 are arranged in different planes so that each dog can operate only one switch.

Switches 151 and 152 have one contact of each connected by a conductor 157 to power line 119 and the other contact of each connected by a conductor 158 to one end of the winding of solenoid 150. The other end of the winding of solenoid 150 is connected by a conductor 159 to conductor 130 which is connected to power line 118 so that solenoid 150 is energized when either of switches 151 or 152 is closed.

When table 1 approaches the end of its movement toward the left, dog 123 will engage the left hand fork of switch arm 121 and operate limit switch 120 from the position shown in Fig. 1 to the position shown in Fig. 5 and thereby cause pump 3 to be reversed as previously explained. At the same time, dog 156 will engage the left hand fork of switch arm 154 and close switch 152 so that solenoid 150 is energized and shifts valve member 95 to the position shown in Fig. 5 to thereby cause the displacement of motor 2 to be increased to maximum in the previously described manner.

Motor 2 will decelerate table 1 to zero speed and then move it toward the right. As table 1 moves toward the right, dog 123 will pass over switch arm 121 without operating it but dog 156 will engage the right hand fork of switch arm 154 and open switch 152 to deenergize solenoid 150 and permit valve member 95 to return to the position shown in Fig. 1 and thereby cause the displacement of motor 2 to be reduced as previously explained.

Table 1 will move toward the right at cutting speed until dog 122 operates switch 120 to effect reversal of pump 3 and dog 155 simultaneously closes switch 151 to cause the displacement of motor 2 to be increased to maximum and thereby enable motor 2 to quickly decelerate table 1 and start it moving toward the left. The displacement of motor 2 will remain at maximum until dog 155 opens switch 151 and then the displacement of motor 2 will be reduced as previously explained.

The arrangement is such that motor 2 is at maximum displacement and is capable of exerting maximum torque during deceleration of table 1 and during acceleration thereof until table 1 reaches the point at which deceleration started.

In order that the planer may be stopped quickly, the drive has been shown in Fig. 5 as being provided with a double acting stop switch 137ª the upper contacts of which are connected in circuit in the same manner that switch 137 is connected in circuit. Switch 137ª has one of its lower contacts connected by a conductor 160 to conductor 130 and its other lower contact connected by a conductor 161 to conductor 158.

The arrangement is such that when switch 137ª is operated to stop the planer, it will break the circuit through magnet 139 and the solenoid 40 or 41 that is energized at that time and thereby cause the displacement of pump 3 to be reduced to zero as previously explained. At the same time, it will establish a circuit (119—138—160—137ª—161—158—150—159—130—118) to energize solenoid 150 which will shift valve member 95 to the position shown in Fig. 5 so that motor 2 has its displacement increased to maximum in the previously described manner and is thus able to exert its maximum torque in decelerating table 1.

The hydraulic drive described herein is susceptible of various modifications and adaptations without departing from the scope of the invention which is hereby claimed as follows:

1. A hydraulic drive, comprising a variable displacement motor for moving an inertia load, a pump for supplying motive liquid to said motor to energize the same, means for varying the delivery of liquid to said motor to thereby cause said motor to accelerate or decelerate said load, and means acting substantially coincidently with said acceleration or deceleration for increasing the displacement of said motor to thereby provide additional motor torque to effect said acceleration or deceleration.

2. A hydraulic drive, comprising a variable displacement motor for moving an inertia load, a variable displacement pump for supplying motive liquid to said motor to energize the same, means for varying the displacement of said pump from zero to a predetermined value to thereby cause said motor to vary the speed of said load from zero to a predetermined speed, the inertia of said load causing an increase in the pressure of said liquid, hydraulic means for controlling the displacement of said motor and normally effective to maintain motor displacement at a predetermined minimum, a valve for controlling said hydraulic means, and means responsive to said increase in pressure for operating said valve to cause said hydraulic means to effect an increase in motor displacement and thereby provide additional motor torque to enable said motor to readily effect said variation in speed.

3. A hydraulic drive, comprising a variable displacement motor for moving an inertia load, a pump for supplying motive liquid to said motor to energize the same, means for varying the delivery of liquid to said motor to thereby cause said motor to accelerate or decelerate said load, means responsive to said load reaching a given point for effecting operation of said delivery varying means, and means operable approximately in unison with said last mentioned means for increasing the displacement of said motor to thereby provide additional motor torque for effecting deceleration or acceleration of sa'd load.

4. A hydraulic drive, comprising a variable displacement motor for moving an inertia load, a variable displacement pump for supplying motive liquid to said motor to energize the same, means for varying the displacement of said pump to thereby cause said motor to accelerate or decelerate said load, means acting substantially coincidently with said acceleration or deceleration for increasing the displacement of said motor to thereby provide additional motor torque to effect said acceleration or deceleration, and means for limiting the rate at which pump displacement is varied.

5. A hydraulic drive, comprising a variable displacement motor for moving an inertia load, a pump for supplying liquid to said motor to enable it to move said load, fluid channels connecting said pump and said motor and forming therewith a hydraulic circuit, means for reversing the flow in said circuit to thereby cause said motor to reverse the direction of movement of said load, and means acting substantially coincidently with said reversal of flow for increasing the displacement of said motor to thereby provide additional motor torque for effecting deceleration and acceleration of said load during reversal thereof.

6. A hydraulic drive, comprising a variable displacement motor for moving an inertia load, a pump for supplying liquid to said motor to enable it to move said load, fluid channels connecting said pump and said motor and forming therewith a hydraulic circuit, means for reversing the flow in said circuit to thereby cause said motor to reverse the direction of movement of said load, means responsive to said load reaching a given point for effecting operation of said flow reversing means, and means operable approximately in unison with said last mentioned means for increasing the displacement of said motor to thereby provide additional motor torque for effecting deceleration or acceleration of said load.

7. A hydraulic drive, comprising a variable displacement motor for moving an inertia load, a reversible pump for supplying liquid to said motor to enable it to move said load, means for reversing said pump to thereby cause said motor to reverse the direction of movement of said load, means acting substantially coincidently with the reversal of said pump for increasing the displacement of said motor to thereby provide additional motor torque for effecting deceleration and acceleration of said load during reversal thereof, and means for limiting the rate at which said pump is reversed.

8. A hydraulic drive, comprising a variable displacement motor for moving an inertia load, a reversible pump for supplying liquid to said motor to enable it to move said load, means for reversing said pump to thereby cause said motor to reverse the direction of movement of said load, means responsive to said load reaching a given point for effecting operation of said pump reversing means, means acting substantially coincidently with the reversal of said pump for increasing the displacement of said motor to thereby provide additional motor torque for effecting deceleration and acceleration of said load during reversal thereof, and means for limiting the rate at which said pump is reversed.

9. A hydraulic drive, comprising a variable displacement motor for moving an inertia load, a pump for supplying motive liquid to said motor to energize the same, means for varying the delivery of liquid to said motor to thereby cause said motor to accelerate or decelerate said load, hydraulic means for adjusting said motor to vary the displacement thereof between predetermined maximum and limited displacements, a valve for controlling said hydraulic means and shiftable between two positions in the first of which it causes said hydraulic means to adjust said motor to a limited displacement and in the second of which it causes said hydraulic means to adjust said motor to a maximum displacement, means for normally retaining said valve in its first position, and means acting coincidently with said acceleration or deceleration for shifting said valve to its second position to increase motor displacement and thereby provide additional motor torque for accelerating or decelerating said load.

10. A hydraulic drive, comprising a variable displacement motor for moving an inertia load, a variable displacement pump for supplying motive liquid to said motor to energize the same, means for varying the displacement of said pump to thereby cause said motor to accelerate and decelerate said load, hydraulic means for adjusting said motor to vary the displacement thereof between predetermined maximum and limited displacements, a valve for controlling said hydraulic means and shiftable between two positions in the first of which it causes said hydraulic means to adjust said motor to a limited displacement and in the second of which it causes said hydraulic means to adjust said motor to a maximum displacement, means for normally retaining said valve in its first position, means responsive to said load reaching a given point for effecting operation of said pump displacement varying means, and means operable approximately in unison with said last mentioned means for shifting said valve to its second position to increase motor displacement and thereby provide additional motor torque for accelerating or decelerating said load.

11. A hydraulic drive, comprising a variable displacement motor for moving an inertia load, a pump for supplying liquid to said motor to enable it to move said load, fluid channels connecting said pump and motor to each other and forming therewith a hydraulic circuit, means for reversing the flow in said circuit to thereby cause said motor to decelerate said load to zero speed and then accelerate it in the opposite direction, the inertia of said load causing an increase in the pressure in said circuit during deceleration and acceleration of said load, and means responsive to said increase in pressure for increasing the displacement of said motor to thereby provide additional motor torque for effecting deceleration or acceleration of said load.

12. A hydraulic drive, comprising a variable displacement motor for moving an inertia load, a pump for supplying liquid to said motor to enable it to move said load, fluid channels connecting said pump and motor to each other and forming therewith a hydraulic circuit, means responsive to said load reaching a given point for reversing the flow in said circuit to thereby cause said motor to decelerate said load to zero speed and then accelerate it in the opposite direction, the inertia of said load causing an increase in the pressure in said circuit during deceleration and acceleration of said load, and means responsive to said increase in pressure for increasing the displacement of said motor to thereby provide additional motor torque for effecting deceleration or acceleration of said load.

13. A hydraulic drive, comprising a pump, a variable displacement vane type motor energized by liquid supplied thereto by said pump and having displacement varying means urged toward maximum displacement position by the pressure of said liquid, fluid channels connecting said pump and said motor and forming therewith a hydraulic circuit, means for varying the flow in said circuit, a hydraulic servo-motor for moving said motor displacement varying means toward zero displacement position, and means for supplying motive liquid to said servo-motor including a valve operable substantially coincidently with the operation of said flow varying means and shiftable to two positions in one of which it directs liquid to said servo-motor to cause the same to reduce motor displacement and in the other of which it connects said servo-motor to drain to permit the pressure in said motor to increase motor displacement.

14. A hydraulic drive, comprising a pump, a variable displacement vane type motor energized by liquid supplied thereto by said pump and having displacement varying means urged toward maximum displacement position by the pressure of said liquid, fluid channels connecting said pump and said motor and forming therewith a hydraulic circuit, means for varying the flow in said circuit, a hydraulic servo-motor for moving said motor displacement varying means toward zero displacement position, means for supplying motive liquid to said servo-motor including a valve shiftable to two positions in one of which it directs liquid to said servo-motor to cause the same to reduce motor displacement and in the other of which it connects said servo-motor to drain to permit the pressure in said motor to increase motor displacement, means for normally urging said valve to its first position, and means responsive to the pressure in said circuit exceeding a predetermined value for shifting said valve to its second position.

15. A hydraulic drive, comprising a pump, a variable displacement vane type motor energized by liquid supplied thereto by said pump and having displacement varying means urged toward maximum displacement position by the pressure of said liquid, fluid channels connecting said pump and said motor and forming therewith a hydraulic circuit, means for varying the flow in said circuit, a hydraulic servo-motor for moving said motor displacement varying means toward zero displacement position, a first stop for preventing said servo-motor from moving said motor displacement varying means beyond a minimum displacement position, a hydraulically actuated stop adapted when energized to prevent said servo-motor from moving said motor displacement varying means beyond an intermediate displacement position, means responsive to the pressure in one side of said circuit exceeding a predetermined value for directing liquid to said hydraulically actuated stop to energize the same, means for supplying motive liquid to said servo-motor including a valve shiftable to two positions in one of which it directs liquid to said servo-motor to cause the same to reduce motor displacement and in the other of which it connects said servo-motor to drain to permit the pressure in said motor to increase motor displacement, and means for shifting said valve from one to the other of its two positions.

16. A hydraulic drive, comprising a pump, a variable displacement vane type motor energized by liquid supplied thereto by said pump and having displacement varying means urged toward maximum displacement position by the pressure of said liquid, fluid channels connecting said pump and said motor and forming therewith a hydraulic circuit, means for varying the flow in said circuit, a hydraulic servo-motor for moving said motor displacement varying means toward zero displacement position, a first stop for preventing said servo-motor from moving said motor displacement varying means beyond a minimum displacement position, a hydraulically actuated stop adapted when energized to prevent said servo-motor from moving said motor displacement varying means beyond an intermediate displacement position, means responsive to the pressure in one side of said circuit exceeding a predetermined value for directing liquid to said hydraulically actuated stop to energize the same, and means for supplying motive liquid to said servo-motor including a valve operable substantially coincidently with the operation of said flow varying means and shiftable to two positions in one of which it directs liquid to said servo-motor to cause the same to reduce motor displacement and in the other of which it connects said servo-motor to drain to permit the pressure in said motor to increase motor displacement.

17. A hydraulic drive, comprising a pump, a variable displacement vane type motor energized by liquid supplied thereto by said pump and having displacement varying means urged toward maximum displacement position by the pressure of said liquid, fluid channels connecting said pump and said motor and forming therewith a hydraulic circuit, means for varying the flow in said circuit, a hydraulic servo-motor for moving said motor displacement varying means toward zero displacement position, a first stop for preventing said servo-motor from moving said motor displacement varying means beyond a minimum displacement position, a hydraulically actuated stop adapted when energized to prevent said servo-motor from moving said motor displacement varying means beyond an intermediate displacement position, means responsive to the pressure in one side of said circuit exceeding a predetermined value for directing liquid to said hydraulically actuated stop to energize the same, means for supplying motive liquid to said servo-motor including a valve shiftable to two positions in one of which it directs liquid to said servo-motor to cause the same to reduce motor displacement and in the other of which it connects said servo-motor to drain to permit the pressure in said motor to increase motor displacement, means for normally urging said valve to its first position, and means responsive to the pressure in said circuit exceeding a predetermined value for shifting said valve to its second position.

18. A hydraulic drive, comprising a pump, a variable displacement vane type motor energized by liquid supplied thereto by said pump and having displacement varying means urged toward maximum displacement position by the pressure of said liquid, fluid channels connecting said pump and said motor and forming therewith a hydraulic circuit, means for reversing the flow in said circuit to thereby reverse said motor, a hydraulic servo-motor for moving said motor displacement varying means toward zero displacement position, a first stop for preventing said servo-motor from moving said motor displacement varying means beyond a minimum displacement position, a hydraulically actuated stop adapted when energized to prevent said servo-motor from moving said motor displacement varying means beyond an intermediate displacement position, means including a valve for supplying liquid to said hydraulically actuated stop to energize the same, means responsive to the reversal of flow in said circuit for operating said valve, means for supplying motive liquid to said servo-motor including a second valve, and means responsive to the pressure in said circuit exceeding a predetermined value for shifting said second valve to its second position.

19. A hydraulic drive, comprising a pump, a variable displacement vane type motor energized by liquid supplied thereto by said pump and having displacement varying means urged toward maximum displacement position by the pressure of said liquid, fluidchannels connecting said pump and said motor and forming therewith a hydraulic circuit, means for reversing the flow in said circuit to thereby reverse said motor, a hydraulic servo-motor for moving said motor displacement varying means toward zero displacement position, a first stop for preventing said servo-motor from moving said motor displacement varying means beyond a minimum displacement position, a hydraulically actuated stop adapted when energized to prevent said servo-motor from moving said motor displacement varying means beyond an intermediate displacement position, means including a valve for supplying liquid to said hydraulically actuated stop to energize the same, means responsive to the reversal of flow in said circuit for operating said valve, means for supplying motive liquid to said servo-motor including a second valve shiftable to two positions in one of which it directs liquid to said servo-motor to cause the same to reduce motor displacement and in the other of which it connects said servo-motor to drain to permit the pressure in said motor to increase motor displacement, and means for shifting said second valve from one to the other of its two positions.

20. A hydraulic drive, comprising a pump, a variable displacement vane type motor energized by liquid supplied thereto by said pump and having displacement varying means urged toward maximum displacement position by the pressure of said liquid, fluid channels connecting said pump and said motor and forming therewith a hydraulic circuit, means for reversing the flow in said circuit to thereby reverse said motor, a hydraulic servo-motor for moving said motor displacement varying means toward zero displacement position, a first stop for preventing said servo-motor from moving said motor displacement varying means beyond a minimum displacement position, a hydraulically actuated stop adapted when energized to prevent said servo-motor from moving said motor displacement varying means beyond an intermediate displacement position, means including a valve for supplying liquid to said hydraulically actuated stop to energize the same, means responsive to the reversal of flow in said circuit for operating said valve, means for supplying motive liquid to said servo-motor including a second valve, means for normally urging said second valve to its first position, and means responsive to the pressure in said circuit exceeding a predetermined value for shifting said second valve to its second position.

WALTER FERRIS.